(12) United States Patent
Malloy

(10) Patent No.: US 11,332,856 B2
(45) Date of Patent: May 17, 2022

(54) NON-KINKING SELF-WRAPPING WOVEN SLEEVE AND METHOD OF CONSTRUCTION THEREOF

(75) Inventor: Cassie Malloy, Bluebell, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 496 days.

(21) Appl. No.: 13/210,638

(22) Filed: Aug. 16, 2011

(65) Prior Publication Data

US 2012/0037263 A1 Feb. 16, 2012

Related U.S. Application Data

(60) Provisional application No. 61/374,010, filed on Aug. 16, 2010.

(51) Int. Cl.

| | |
|---|---|
| *D03D 3/02* | (2006.01) |
| *D06C 7/02* | (2006.01) |
| *D03D 41/00* | (2006.01) |
| *D03D 3/00* | (2006.01) |
| *D03D 15/00* | (2021.01) |
| *H02G 3/04* | (2006.01) |
| *D03D 13/00* | (2006.01) |
| *D03D 15/567* | (2021.01) |

(52) U.S. Cl.
CPC ............ *D03D 3/00* (2013.01); *D03D 3/005* (2013.01); *D03D 13/008* (2013.01); *D03D 15/00* (2013.01); *D03D 15/567* (2021.01); *D06C 7/02* (2013.01); *H02G 3/0481* (2013.01); *D10B 2401/041* (2013.01)

(58) Field of Classification Search
None
See application file for complete search history.

(56) References Cited

U.S. PATENT DOCUMENTS

| | | |
|---|---|---|
| 5,131,434 A | 7/1992 | Krummheuer et al. |
| 5,556,495 A | 9/1996 | Ford et al. |
| (Continued) | | |

FOREIGN PATENT DOCUMENTS

| | | |
|---|---|---|
| CN | 1222223 | 7/1999 |
| CN | 1556267 | 12/2004 |
| (Continued) | | |

OTHER PUBLICATIONS

Wikipedia—Picks per inch, page visited on Jul. 18, 2017.*

(Continued)

*Primary Examiner* — Shawn McKinnon
(74) *Attorney, Agent, or Firm* — Robert L. Stearns; Dickinson Wright, PLLC

(57) ABSTRACT

A wrappable textile sleeve and method of construction thereof is provided. The textile sleeve includes an elongate wall extending along a longitudinal axis between opposite ends with lengthwise extending edges extending along the longitudinal axis between the opposite ends. The wall is woven from lengthwise extending warp yarns and circumferentially extending weft yarns with at least some of the weft yarns being heat-set to impart a self curling bias on the wall to bring the edges into overlapping relation with one another. Further, the weft yarns form a plurality of discrete annular bands that extend circumferentially about the longitudinal axis with adjacent bands having different picks-per-inch from one another to provide the sleeve with enhance regions of flexibility, self-curling bias and hoop strength.

19 Claims, 3 Drawing Sheets

(56) References Cited

U.S. PATENT DOCUMENTS

| | | | |
|---|---|---|---|
| 5,843,542 A * | 12/1998 | Brushafer et al. | 428/36.1 |
| 7,216,678 B2 * | 5/2007 | Baer | 139/384 R |
| 2002/0058992 A1 * | 5/2002 | Greenhalgh | 623/1.35 |
| 2003/0089971 A1 * | 5/2003 | Akers et al. | 257/678 |
| 2004/0016041 A1 * | 1/2004 | Uno | A41D 13/0015 2/113 |
| 2006/0016507 A1 | 1/2006 | Baer | |
| 2009/0218002 A1 | 9/2009 | Kasihara | |
| 2009/0226653 A1 | 9/2009 | Harris | |

FOREIGN PATENT DOCUMENTS

| | | |
|---|---|---|
| EP | 0620873 B1 | 6/1997 |
| JP | S42006295 Y1 | 3/1967 |
| JP | H07500882 A | 1/1995 |
| JP | 3222158 B2 | 10/2001 |
| KR | 20070039540 A | 4/2007 |
| WO | 93/14253 | 7/1993 |
| WO | WO2009089238 * | 7/2009 |

OTHER PUBLICATIONS

International Search Report dated Jan. 25, 2012 (PCT/US2011/047877).

"Textile Material," Weidong Yu, pp. 302-303, China Textile Press, May 2006.

* cited by examiner

NON-KINKING SELF-WRAPPING WOVEN SLEEVE AND METHOD OF CONSTRUCTION THEREOF

CROSS-REFERENCE TO RELATED APPLICATION

This application claims the benefit of U.S. Provisional Application Ser. No. 61/374,010, filed Aug. 16, 2010, which is incorporated herein by reference in its entirety.

BACKGROUND OF THE INVENTION

1. Technical Field

This invention relates generally to protective textile sleeves for protecting elongate members, and more particularly, to self-wrapping woven protective sleeves.

2. Related Art

It is known to utilize textile sleeves to protect elongate members from a variety of external environmental conditions, including braided, knit or woven textile sleeves. Depending on the type of textile sleeve, the sleeve can either be formed having a seamless, tubular wall, or an open, wrappable wall, wherein the wrappable wall can be further constructed as a self-wrapping wall. Braided sleeves, though useful in a number of applications, and in many cases offering a non-kinking wall due to the ability of the braided yarns to slide relative to one another, come with some design and manufacturability limitations. In particular, the type of materials that can be braided and the location of specific types of materials within the braid is limited. Woven sleeves typically overcome the manufacturing drawbacks encountered with braiding, however, they have their own drawbacks. For example, woven sleeves, in order to be formed as a self-wrapping structure, typically include heat-settable yarns woven in the circumferential, weft direction. Though useful in imparting the bias necessary to cause the wall to self-wrap, these yarns inherently make the sleeve more rigid along its length, and thus, make the sleeve susceptible to kinking when bent around corners, particularly if the corners are 90 degrees or greater.

Accordingly, what is needed is a textile sleeve that combines the benefits of a braided sleeve and a woven sleeve, while avoiding their drawbacks, and also providing a textile sleeve that is economical in manufacture, allows a variety of yarn types to be used, and is non-kinking when bent around corners of 90 degrees or more.

SUMMARY OF THE INVENTION

In accordance with one aspect of the invention, a wrappable textile sleeve is provided. The textile sleeve includes an elongate wall extending along a longitudinal axis between opposite ends with lengthwise extending edges extending along the longitudinal axis between the opposite ends. The wall is woven from lengthwise extending warp yarns and circumferentially extending weft yarns with at least some of the weft yarns being heat set to impart a self curling bias on the wall to bring the edges into overlapping relation with one another. Further, the weft yarns form a plurality of discrete annular bands that extend circumferentially about the longitudinal axis with adjacent bands having different picks-per-inch from one another.

In accordance with another aspect of the invention, a method of constructing a wrappable textile sleeve is provided. The method includes weaving an elongate wall having opposite edges that extend along a longitudinal axis between opposite ends. The wall is woven with warp yarns that extend along the longitudinal axis between the opposite ends and weft yarns that extend between the opposite edges. During the weaving process, the method further includes forming a plurality of discrete annular bands that extend between the opposite edges with the weft yarns with adjacent bands having different picks-per-inch from one another. Then, heat-setting at least some of the weft yarns and imparting a bias on the wall to bring the edges into overlapping relation with one another.

The woven, self-wrapping sleeve provides the desired protection to elongate members contained therein, while also having an enhanced degree of flexibility to allow the sleeve to be routed about corners of 90 degrees or more without kinking. The enhanced flexibility is provided by the adjacent, discrete bands of weft yarn having different picks-per-inch from one another. The bands having an increased picks-per-inch count provide an enhanced, heat-set bias on the sleeve wall to maintain the opposite edges in their overlapping relation, while also providing enhanced hoop strength and coverage. Meanwhile, the bands having a reduced picks-per-inch count provide the enhance flexibility to the sleeve wall, while at the same time also being able to impart a heat-set bias on the sleeve wall, if the weft yarns with these bands are provided at least in part as heat-settable yarn.

BRIEF DESCRIPTION OF THE DRAWINGS

These and other aspects, features and advantages of the present invention will become more readily appreciated by those possessing ordinary skill in the art when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
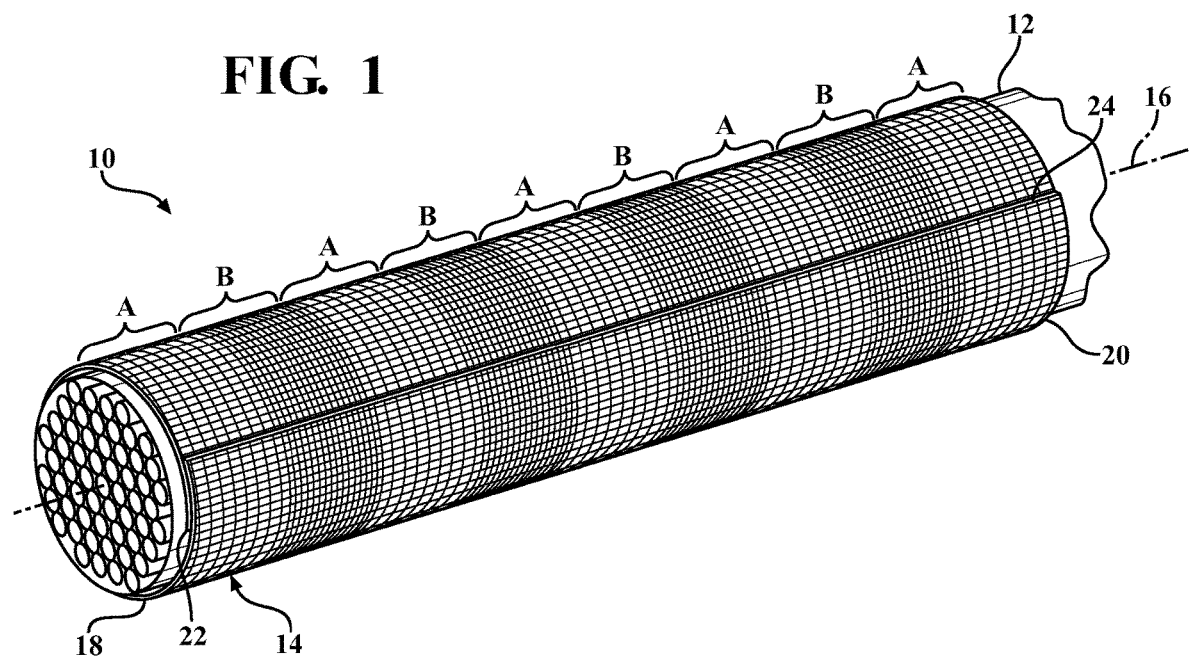
FIG. 1 is a schematic perspective view of a woven, self-wrapping sleeve constructed in accordance with one aspect of the invention shown wrapped about an elongate member.
Figure 2:
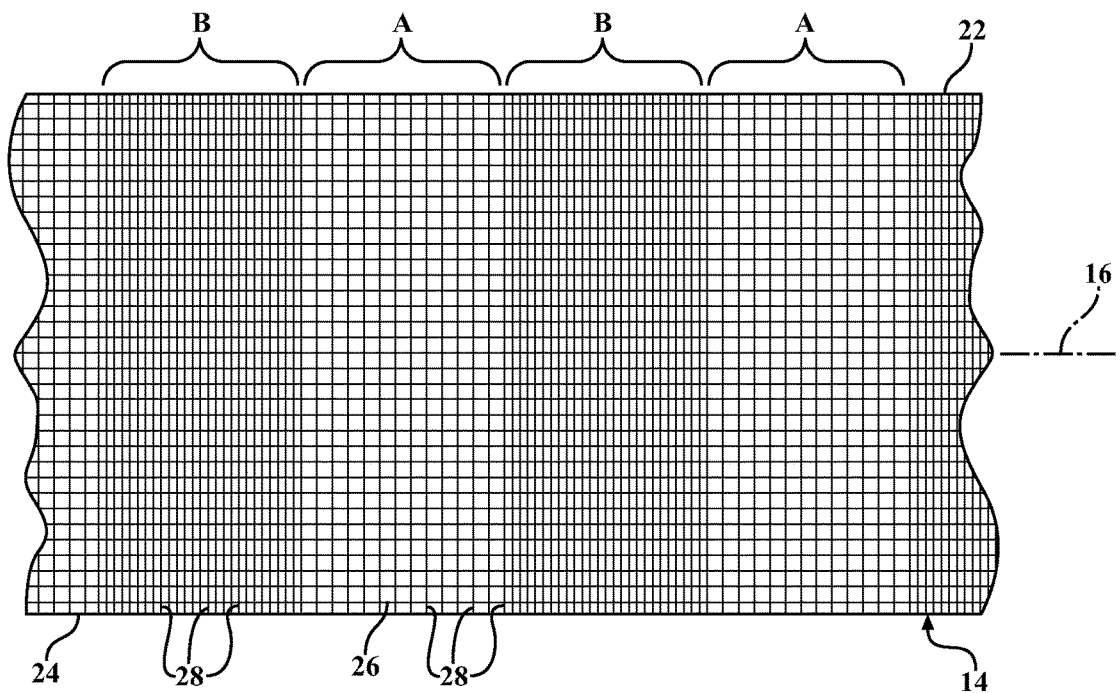
FIG. 2 is an enlarged partial plan view of a wall of the sleeve of FIG. 1.

Referring in more detail to the drawings, FIG. 1 illustrates a textile sleeve 10 constructed in accordance with one aspect of the invention self-wrapped about an elongate member 12 to be protected, such as a pipe, or as shown, a wire harness, for example. The sleeve 10 has an elongate wall 14 that extends along a longitudinal axis 16 between opposite ends 18, 20 with lengthwise extending edges 22, 24 extending along, and shown as being parallel or substantially parallel to, the longitudinal axis 16 between the opposite ends 18, 20. As best shown in FIG. 2, the wall 14 is woven from at least one lengthwise extending warp yarn 26 and circumferentially extending weft yarns 28 with at least some of the weft yarns 28 being provided to be heat-set to impart a self curling, also referred to as self wrapping, bias on the wall 14 to bring the opposite edges 22, 24 into overlapping relation with one another to fully enclose and protect the elongate member 12. The weft yarns 28 are woven to form a plurality of discrete annular bands, represented by way of example and without limitation by A, B, extending and alternating with one another along the longitudinal axis 16 with immediately adjacent bands A, B having different picks-per-inch from one another. Accordingly, one set of the bands A has a reduced pick count (picks-per-inch) of weft yarns 28 than the intermediate set of bands B, thus, providing the sleeve 10 with varying physical properties along the length of the sleeve 10. The bands A, having the relatively reduced pick count, provide the sleeve 10 with an enhanced flexibility and ability to bend around corners, including corners of 90 degrees or more, without kinking, while the bands B, having an increased pick count relative to the bands A, provide the sleeve 10 with an enhanced self-wrapping capability, while also increasing the hoop strength, and thus, crush strength of the sleeve 10. Additional benefits provided by the bands A, B are discussed below, with others becoming readily apparent to those possessing ordinary skill in the art.

The warp yarn 26 can be provided of any suitable yarn material and type, including monofilament or multifilament yarn, and in any suitable number of ends. Preferably, the warp yarn 26 is provided at least in part of multifilament yarn to enhance the coverage protection provided by the wall 14 to the enclosed elongate member 12, and can be provided entirely of non-heat-settable multifilament yarn, by way of example and without limitation.

The weft yarns 28 are provided at least in part of heat-settable monofilament yarn within both bands A, B, and can be provided entirely of heat-settable monofilament yarn, if desired. Otherwise, the bands A, B can also include multifilament yarns, if desired for the intended application. The alternating bands A, B, as discussed above, have different picks-per-inch, including different picks-per-inch of the heat-settable weft yarns 28, wherein each of the bands A have generally the same picks-per-inch of the heat-settable weft yarn 28 and each of the bands B have generally the same picks-per-inch of the heat-settable weft yarn 28. Accordingly, every other band, whether A or B, has substantially the same picks-per-inch of the heat-settable weft yarn 28.

The circumferentially extending bands A, having a reduced pick count of the heat-settable monofilament yarns 28 relative the bands B, provide the sleeve wall 14 with an enhanced ability to flex and bend around sharp corners of 90 degrees and greater without causing the wall 14 to kink. At the same time, if the bands A include the heat-settable monofilament yarns 28, the bands A contribute to the self-curling bias force that brings the opposite edges 22, 24 into their overlapping relation with one another.

The circumferentially extending bands B, having an increased pick count of the heat-settable monofilament yarns 28 relative to the bands A, provide the sleeve wall 14 with sections of increased hoop strength relative to the bands A. Further, the bands B provide the majority of the self-wrapping bias that brings the opposite edges 22, 24 into their overlapping relation with one another.

In addition to providing the weft yarns 28 having different pick counts across the alternating bands A, B, the weft yarns 28 can be provided having different sizes and different densities within each of the bands A, B to provide the sleeve wall 14 with the flex and coverage properties desired. Accordingly, the bands A can include weft yarns 28 having one size and density while the bands B can include weft yarns 28 having a different size and density from those in the bands A.

Figure 3:
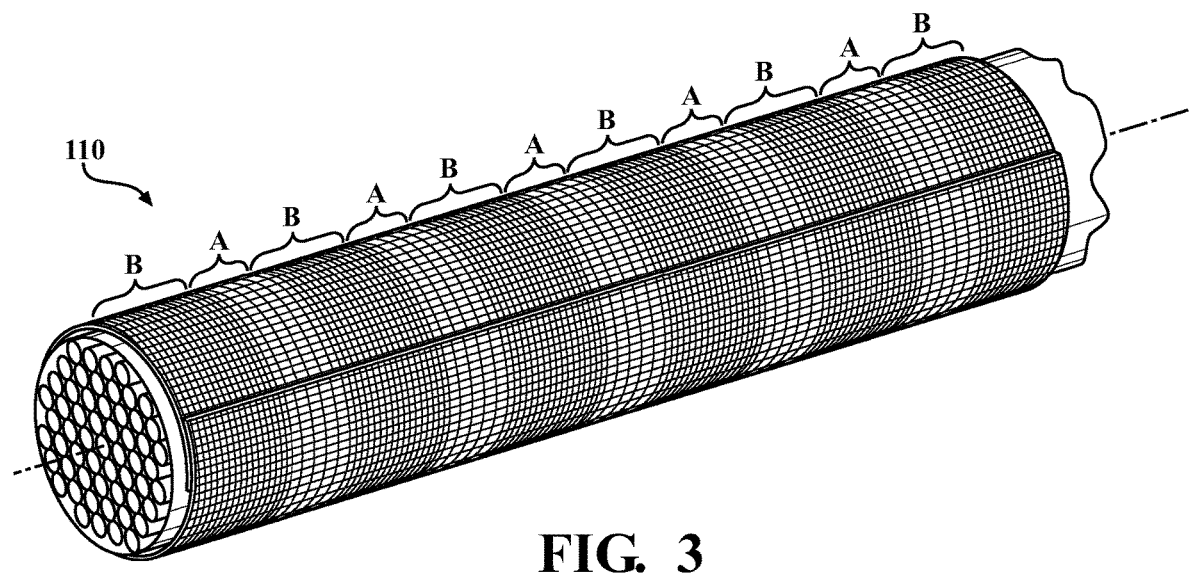
FIG. 3 is a schematic perspective view of a woven, self-wrapping sleeve constructed in accordance with another aspect of the invention.
Figure 5:
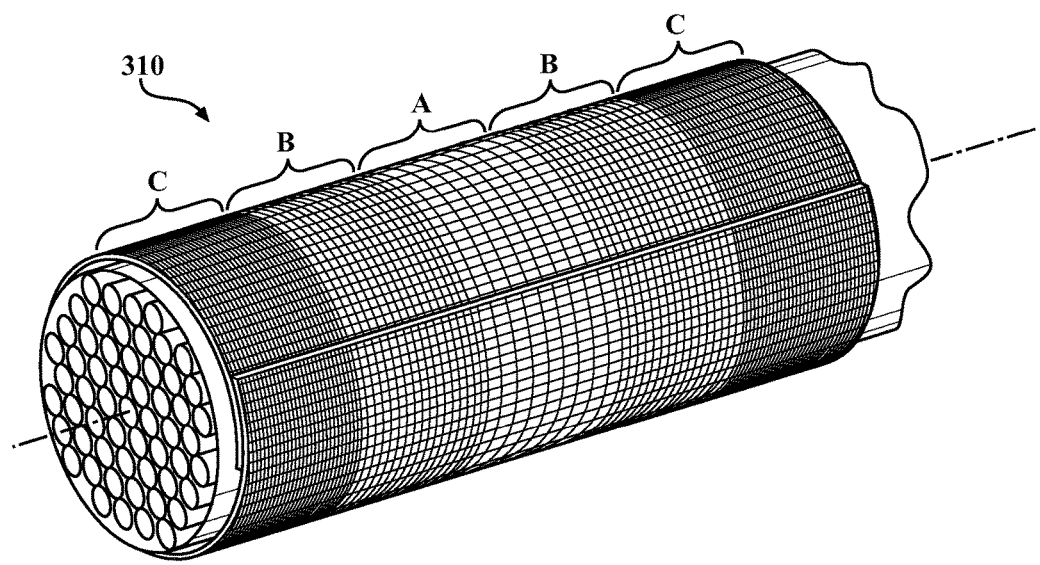
FIG. 5 is a schematic perspective view of a woven, self-wrapping sleeve constructed in accordance with yet another aspect of the invention.
Figure 4:
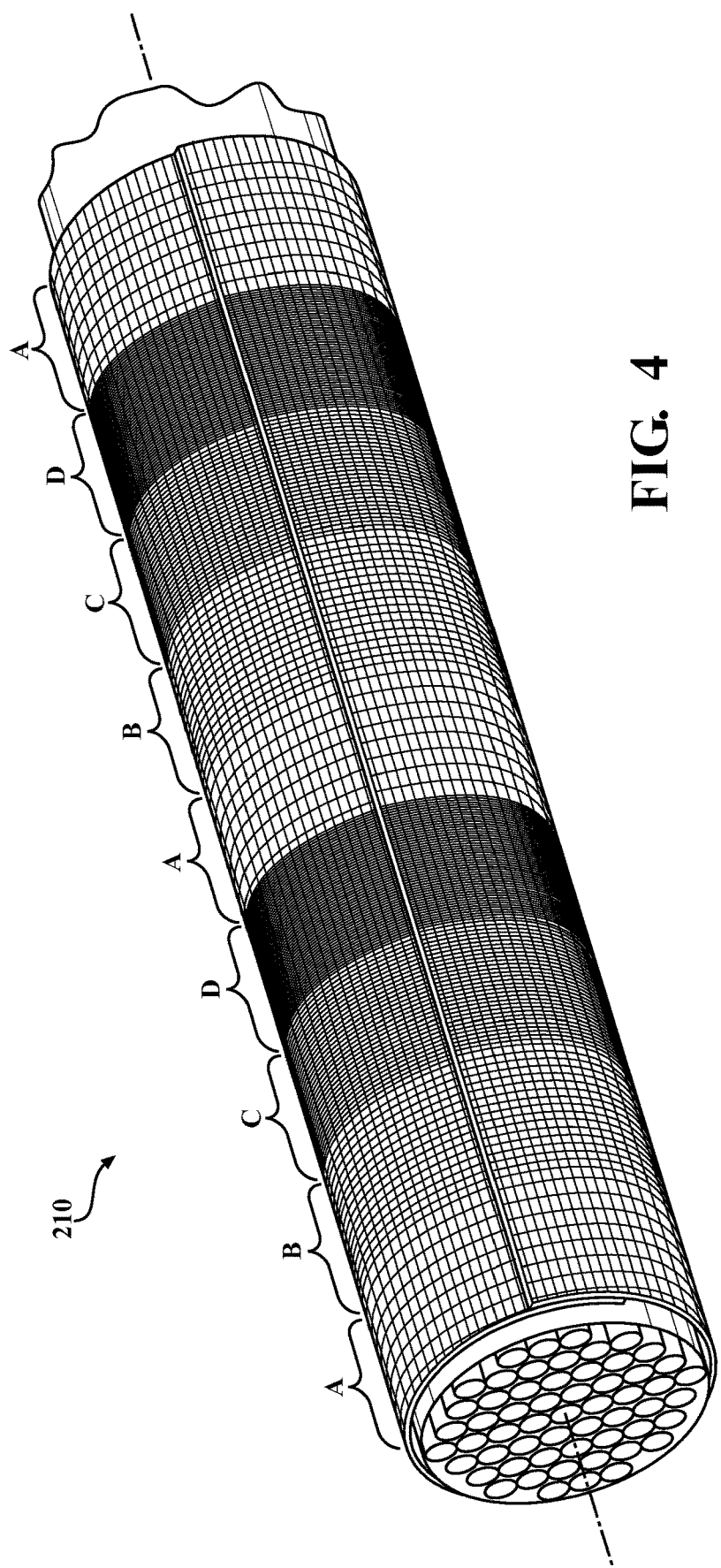
FIG. 4 is a schematic perspective view of a woven, self-wrapping sleeve constructed in accordance with yet another aspect of the invention.

Each of the bands A, B can be constructed having any desired axially extending length, wherein the individual lengths of the bands A, B can vary over the full axial length of the sleeve 10, such as shown in a sleeve 110 of FIG. 3. Accordingly, where a high degree of flex is needed in use, the bands A can be constructed having an increased axial length, and/or they can be provided in increased numbers. Further, the frequency of alternating bands A, B can be increased relative to other sections of the sleeve 10 to provide localized areas of the sleeve with different flexing properties and hoop strength properties relative to other areas of the sleeve. As such, not only can the axial length of each band A, B be controlled, but so to can the frequency over which they are present over a given axial length. Accordingly, one given section length of the sleeve 10 may have a total number of 10 individual bands A, B, while another section length of the same axial length may only have 5 individual bands, for example, wherein the alternating bands A, B forming each section can have the same axial length as one another, such as shown in FIG. 1, or they can be different, such as shown in FIG. 3, depending on the flex/hoop strength characteristics desired over any given region of the sleeve 10. Additionally, it is contemplated herein that additional bands may be incorporated along the length of the sleeve, such that the sleeve may have a series of bands A, B, C, D, and further yet, the series of bands A, B, C, D can be repeating, such as shown in a sleeve 210 of FIG. 4. As shown, the picks-per-inch in each band are different from one another wherein the picks-per-inch of band A are less than the picks-per-inch of band B, the picks-per-inch of band B are less than the picks-per-inch of band C, and the picks-per-inch of band C are less than the picks-per-inch of band D, such that A<B<C<D. In accordance with yet another aspect of the invention, such as shown in a sleeve 310 of FIG. 5, the sleeve 310 may have a series of bands A, B, C, B, A, wherein the picks-per-inch in each band are different from one another and with the picks-per-inch of band A being less than the picks-per-inch of band B and the picks-per-inch of band B being less than the picks-per-inch of band C, such that A<B<C. Accordingly, depending on the physical attributes desired for the intended application, a sleeve can be constructed having any number of separate bands, wherein the individual bands can be formed having the desired number of picks-per-inch and yarn types/densities to provide the desired flex, hoop strength and self-curling bias.

In addition to the sleeve 10, 110, 210, 310 discussed above, another aspect of the invention includes a method of making a sleeve 10, 110, 210, 310. The method includes weaving an elongate wall 14 from lengthwise extending warp yarns 26 extending along a longitudinal axis 16 between opposite ends 18, 20 and circumferentially extending weft yarns 28 extending between opposite edges 22, 24 extending lengthwise between the opposite ends 18, 20. Further, forming a plurality of discrete annular bands A, B extending between the opposite edges 22, 24 with the weft yarns 18 during the weaving process with adjacent bands A, B having different picks-per-inch from one another. In addition, heat-setting at least some of the weft yarns 28 to impart a self-wrapping bias on the wall 14 to bring the opposite edges 22, 24 into overlapping relation with one another. In addition, the method also includes steps to construct the sleeve 10 as discussed above, such as providing the weft yarns 28 having different sizes and densities within the discrete bands A, B, such that the bands A include weft yarns 28 of one size and density, while the bands B include weft yarns 28 having a different size and density from those of the bands A. Further yet, the method includes forming the sleeve having any number of discreet annular bands, as desired, such as discussed above for the sleeves 210, 310 including bands A, B, C, D and A, B, C, respectively.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A wrappable textile sleeve, comprising:
an elongate, generally circular cylindrical wall extending along a longitudinal axis between opposite ends with lengthwise extending edges extending along said longitudinal axis between said opposite ends, said wall being woven from lengthwise extending warp yarns and circumferentially extending weft yarns with at least some of said weft yarns being heat-set to impart a self curling bias on said wall to bring said edges into overlapping relation with one another; and
said weft yarns forming a plurality of discrete annular bands including a plurality of first bands and a plurality of second bands, said first and second bands extending circumferentially about said longitudinal axis in alternating generally circular cylindrical relation with one another, each of said discrete bands including a plurality of said weft yarns with adjacent bands having different picks-per-inch from one another, said first bands having a plurality of said weft yarns spaced axially from one another to define a first pick density extending axially along said longitudinal axis a first distance extending the full length of said first bands and having a first picks-per-inch and said second bands having a plurality of said weft yarns spaced axially from one another to define a second pick density, different from said first pick density of said first bands, extending axially along said longitudinal axis a second distance extending the full length of said second bands and having a second picks-per-inch, said first picks-per-inch being less than said second picks-per-inch to provide said first bands with an increased axial flexibility relative to said second bands to facilitate bending said elongate wall around corners.

2. The wrappable textile sleeve of claim 1 wherein every other band has substantially the same picks-per-inch.

3. The wrappable textile sleeve of claim 1 wherein said second bands include said heat-set weft yarns and said first bands being free of said heat-set weft yarns.

4. The wrappable textile sleeve of claim 1 wherein said adjacent bands have different picks-per-inch of said heat-set weft yarns.

5. The wrappable textile sleeve of claim 1 wherein at least some of said warp yarns are multifilaments.

6. The wrappable textile sleeve of claim 5 wherein said heat-set weft yarns are monofilaments.

7. The wrappable textile sleeve of claim 1 wherein every other one of said bands extend axially over substantially the same axial length.

8. A method of constructing a wrappable textile sleeve, comprising:
weaving an elongate, generally circular cylindrical wall having opposite ends with opposite edges extending lengthwise along a longitudinal axis between the ends with warp yarns extending generally parallel to the longitudinal axis between the opposite ends and weft yarns extending generally transversely to the longitudinal axis between the opposite edges;
forming a plurality of annular bands extending between the opposite edges with the weft yarns, said bands including a plurality of first bands and a plurality of second bands alternating in generally circular cylindrical relation with one another, said first and second bands each including a plurality of the weft yarns and having different picks-per-inch from one another, said first bands having a plurality of said weft yarns each spaced axially from one another to define a first pick density extending axially along the longitudinal axis a first distance extending the full length of said first bands and having a first picks-per-inch inch and said second bands having a plurality of said weft yarns each spaced axially from one another to define a second pick density, different from said first pick density of said first bands, extending axially along the longitudinal axis a second distance extending the full length of said second bands and having a second picks-per-inch inch, said first picks-per-inch being less than said second picks-per-inch to provide said first bands with an increased axial flexibility relative to said second bands to facilitate bending said elongate wall around corners; and
heat-setting at least some of the weft yarns to impart a bias on the wall to bring the opposite edges into overlapping relation with one another.

9. The method of claim 8 further including weaving every other band having substantially the same picks-per-inch.

10. The method of claim 8 further including heat-setting weft yarns in every other band such that the second bands include heat-set weft yarns and the first bands remain free of heat-set weft yarns.

11. The method of claim 8 further including providing at least some of the warp yarns as multifilaments.

12. The method of claim 11 further including providing the heat-set weft yarns as monofilaments.

13. The method of claim 8 further including weaving every other one of the bands having substantially the same axially extending length.

14. A wrappable textile sleeve, comprising:
an elongate, generally circular cylindrical wall extending along a longitudinal axis between opposite ends with lengthwise extending edges extending along said longitudinal axis between said opposite ends, said wall being woven from lengthwise extending warp yarns and circumferentially extending weft yarns with at least some of said weft yarns being heat-set to impart a self curling bias on said wall to bring said edges into overlapping relation with one another; and
said weft yarns forming a plurality of discrete annular bands including a plurality of first bands and a plurality of second bands, said first and second bands extending circumferentially about said longitudinal axis in alternating, generally circular cylindrical relation with one another, each of said discrete bands including a plurality of said weft yarns with adjacent bands having different picks-per-inch from one another defined by said weft yarns in each of said discrete annular bands being woven in side-by-side, axially spaced relation from one another.

15. The wrappable textile sleeve of claim 14 wherein said first bands extend axially along said longitudinal axis a first distance and have a first picks-per-inch and said second bands extend axially along said longitudinal axis a second distance and have a second picks-per-inch, said first distance being substantially equal to said second distance and said first picks-per-inch being less than said second picks-per-inch.

16. The wrappable textile sleeve of claim 14 wherein said first bands extend axially along said longitudinal axis a first distance and have a first picks-per-inch and said second bands extend axially along said longitudinal axis a second distance and have a second picks-per-inch, said first distance being less than said second distance and said first picks-per-inch being less than said second picks-per-inch.

17. The wrappable textile sleeve of claim 1 wherein said first distance is less than said second distance.

18. The method of claim 8 further including weaving the first distance being less than the second distance.

19. The wrappable textile sleeve of claim 1 further including discrete annular third bands extending circumferentially about said longitudinal axis, said first, second and third bands extending in alternating generally circular cylindrical relation with one another, said third bands having a third picks-per-inch, said second picks-per-inch being less than said third picks-per-inch to provide said second bands with an increased axial flexibility relative to said third bands.

* * * * *